United States Patent
Tai et al.

(10) Patent No.: US 7,233,133 B2
(45) Date of Patent: Jun. 19, 2007

(54) HIGH-EFFICIENCY TWO-STEP DC-TO-DC CONVERTER

(75) Inventors: Liang-Pin Tai, Tainan (TW); Jiun-Chiang Chen, Houli Township, Taichung County (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/114,060

(22) Filed: Apr. 26, 2005

(65) Prior Publication Data

US 2005/0253567 A1    Nov. 17, 2005

(30) Foreign Application Priority Data

May 11, 2004    (TW) ................ 93113207 A

(51) Int. Cl.
*G05F 1/00*    (2006.01)
(52) U.S. Cl. .................................... 323/282
(58) Field of Classification Search ................ 323/268, 323/282, 283, 351
See application file for complete search history.

(56) References Cited

U.S. PATENT DOCUMENTS

| | | | |
|---|---|---|---|
| 6,239,995 B1 * | 5/2001 | Weng et al. .................. 363/89 |
| 6,839,252 B2 * | 1/2005 | Tai et al. ...................... 363/65 |
| 6,876,190 B2 * | 4/2005 | Tai et al. ................. 324/117 R |
| 6,897,641 B1 * | 5/2005 | Herbert ...................... 323/282 |
| 6,946,823 B2 * | 9/2005 | Huang et al. ............... 323/282 |
| 6,960,905 B2 * | 11/2005 | Chen et al. ................. 323/283 |
| 7,064,533 B2 * | 6/2006 | Hsu ........................... 323/282 |

* cited by examiner

*Primary Examiner*—Adolf Berhane
(74) *Attorney, Agent, or Firm*—Rosenberg, Klein & Lee

(57) ABSTRACT

A two-step DC-to-DC converter comprises a first converter stage for converting a first voltage to a second voltage, and a second converter stage for converting the second voltage to an output voltage. The first converter stage uses a MOSFET or normally-off JFET to serve as a high-side switch, and the second converter stage comprises a multi-phase modulator using a normally-on JFET to serve as a high-side switch, thereby improving the efficiency of the two-step DC-to-DC converter.

6 Claims, 3 Drawing Sheets

HIGH-EFFICIENCY TWO-STEP DC-TO-DC CONVERTER

FIELD OF THE INVENTION

The present invention is related generally to a DC-to-DC converter and more particularly, to a high efficiency two-step DC-to-DC converter.

BACKGROUND OF THE INVENTION

DC-to-DC converter has been widely used in various electronic apparatus to regulate the DC level of the supplied voltage, especially to level the voltage up or down at a desired value.

FIG. 1 shows a simplified conventional multi-phase DC-to-DC converter 10, which comprises multiple channels 12 connected in parallel to the converter output Vout. In each channel 12, a high-side MOSFET 122 is coupled between the input voltage Vin and a phase node 126, a low-side MOSFET 124 is coupled between the phase node 126 and ground GND, and the MOSFETs 122 and 124 are alternatively switched by drive signals UV and LV to generate a phase current I flowing through an inductor L to charge a capacitor Co to thereby generate an output voltage Vout. Due to the requirements to the operating voltage and cost for electronic apparatus, recent arts try to replace the low-side MOSFET 124 with normally-on Junction Field-Effect Transistor (JFET) or normally-off JFET to reduce the conductive impedance and cost. However, the high-side MOSFET 122 is only possible to be replaced with normally-off JFET, but not with normally-on JFET, it is for the reason that at the moment of the converter 10 powered on or powered off, the high-side drive signal UV cannot respond in time, such that if a normally-on JFET is used to serve as the high-side switch, the input voltage Vin will be short to the output Vout at the moment of powered on or powered off, and thereby to damage the load circuit coupled to the output Vout. A normally-on JFET is referred to the one that is conductive between its source and drain when the voltage difference between its gate and source is zero (i.e., $V_{gs}=0$), and will turn off when this voltage difference is less than a negative threshold voltage VtN (i.e., $V_{gs} < V_{tN}$), while a normally-off JFET is referred to the one that is cut-off between its source and drain when $V_{gs}=0$, and will turn on when $V_{gs}$ is greater than a positive threshold voltage $V_{tN}$ (i.e., $V_{gs} > V_{tN}$). It is well known that a normally-on JFET has a lower conductive impedance than that of a normally-off JFET.

On the other hand, in the two-step multi-phase DC-to-DC converter proposed in U.S. Pat. No. 6,839,252 issued to the co-inventor, the supply voltage is first converted to a second voltage by a single-phase or multi-phase voltage converter, and then a multi-phase voltage converter is used to convert the second voltage to the output voltage, such that the ripple is minimized, and the product of the inductance and capacitance is reduced. As a result, the efficiency is improved. However, the prior two-step multi-phase DC-to-DC converter did not teach to use JFET to serve as the high-side switch of the voltage converter.

SUMMARY OF THE INVENTION

One object of the present invention is to provide a two-step DC-to-DC converter having a higher efficiency.

Another object of the present invention is to provide a two-step DC-to-DC converter having normally-on JFET to serve as its high-side switch to improve the conversion efficiency thereof.

According to the present invention, a two-step DC-to-DC converter comprises a first converter stage for converting a first voltage to a second voltage, and a second converter stage for converting the second voltage to an output voltage. The first converter stage uses a MOSFET or normally-off JFET to serve as its high-side switch, and the second converter stage comprises a multi-phase modulator using a normally-on JFET to serve as its high-side switch.

In a two-step DC-to-DC converter according to the present invention, a normally-on JFET is used to serve as the high-side switch, and thus the efficiency of the converter is improved due to the lower conductive impedance of the normally-on JFET.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
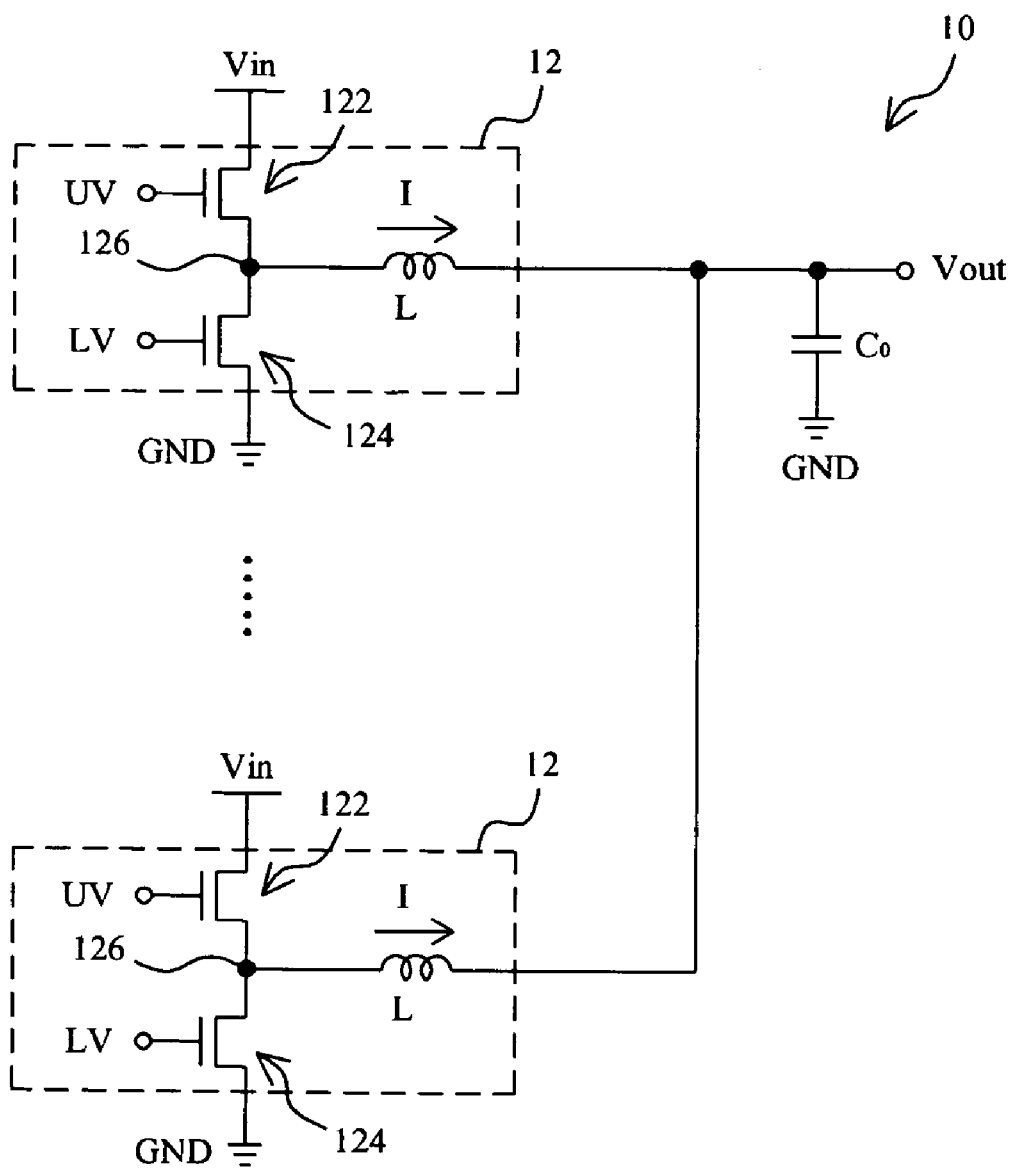
FIG. 1 shows a simplified conventional multi-phase DC-to-DC converter.
Figure 2:
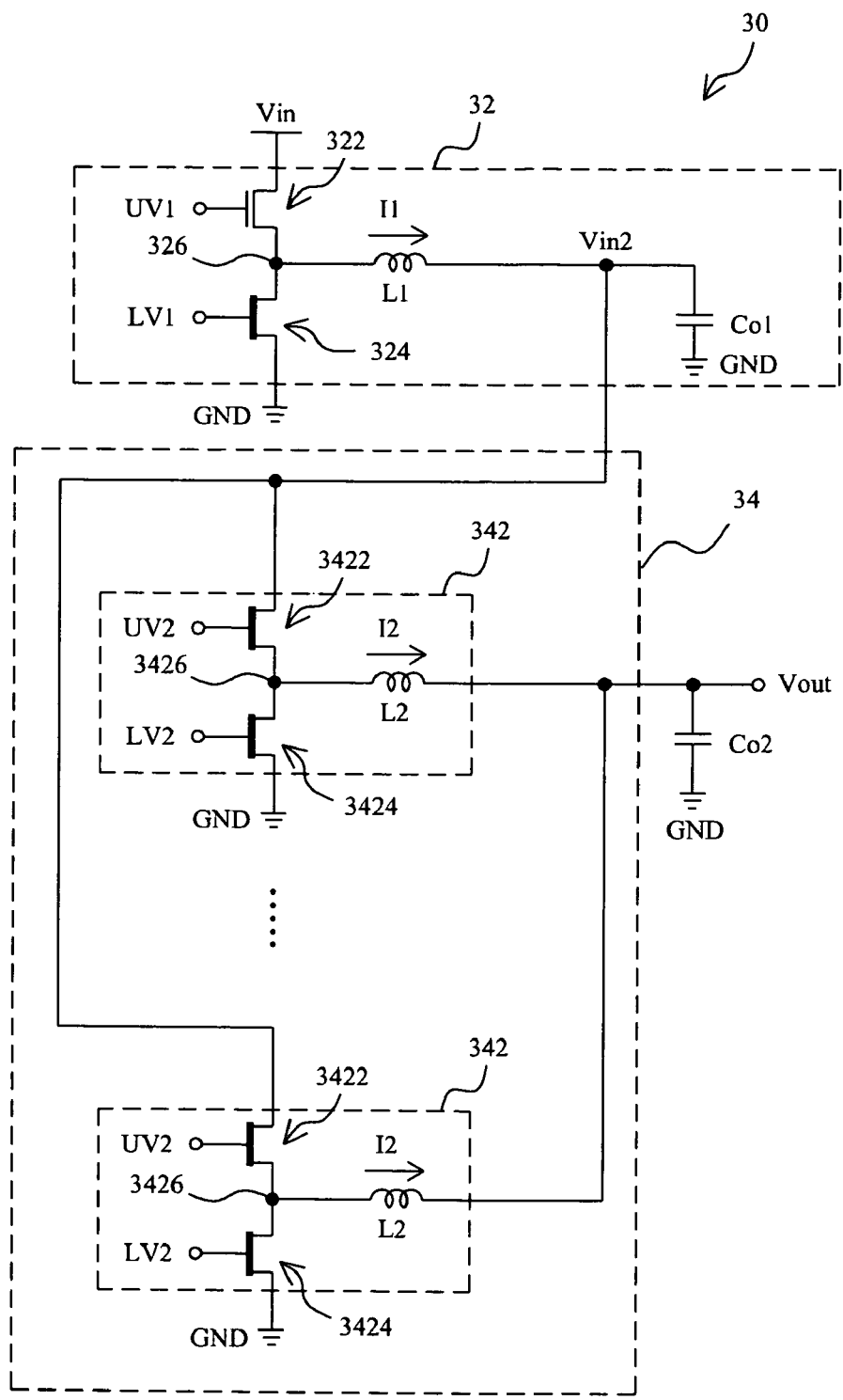
FIG. 2 shows a two-step DC-to-DC converter according to the present invention.

FIG. 2 shows a two-step DC-to-DC converter 30, which comprises a first converter stage 32 to convert a supply voltage Vin to a voltage Vin2 supplied to a second converter stage 34. In the first converter stage 32, a MOSFET 322 is coupled between the input voltage Vin and a node 326, a normally-on JFET 324 is coupled between the node 326 and ground GND, and the MOSFET 322 and the JFET 324 are alternatively switched by drive signals UV1 and LV1 to generate an output current I1 flowing through an inductor L1 to charge a capacitor Co1 to thereby generate the voltage Vin2. In the second converter stage 34, multiple channels 342 are connected in parallel to an output Vout to convert the voltage Vin2 to an output voltage Vout. In each channel 342, a normally-on JFET 3422 is coupled between the voltage Vin2 and a phase node 3426, a normally-on JFET 3424 is coupled between the phase node 3426 and ground GND, and the JFETs 3422 & 3424 are alternatively switched by drive signals UV2 and LV2 to generate a phase current I2 flowing through an inductor L2 to charge a capacitor Co2 to thereby generate the output voltage Vout.

Figure 3:
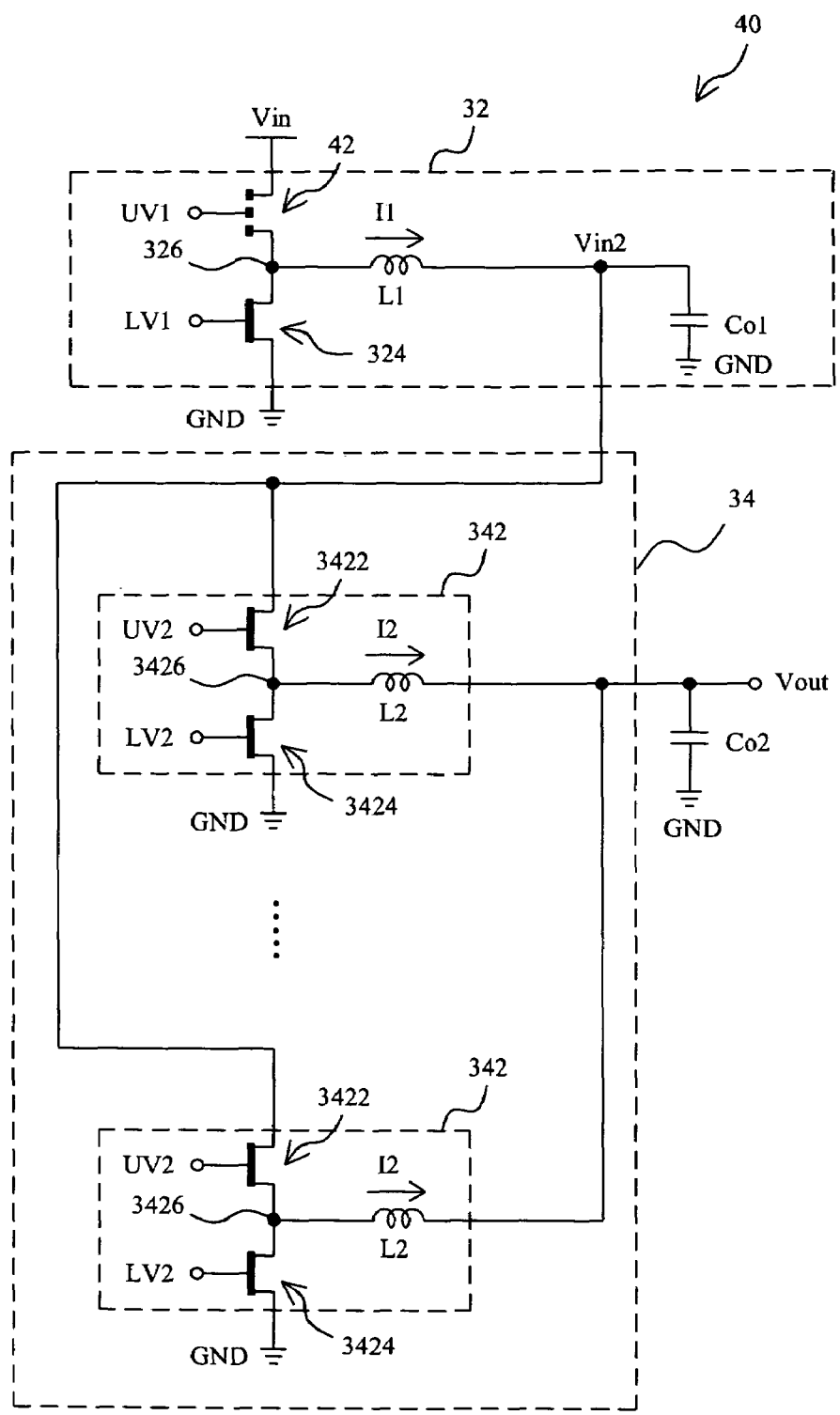
FIG. 3 shows another two-step DC-to-DC converter according to the present invention.

FIG. 3 shows another two-step DC-to-DC converter 40, which also comprises a first converter stage 32 and a second converter stage 34. In the first converter stage 32, there is also comprised the normally-on JFET 324 to serve as the low-side switch, the inductor L1 and the capacitor Co1, as in the first embodiment, while it is a normally-off JFET 42 coupled between the supply voltage Vin and the node 326 to serve as the high-side switch. The JFETs 42 and 324 are alternatively switched by the drive signals UV1 and LV1 to generate the voltage Vin2. In the second converter stage 34, each channel 342 also comprises the normally-on JFETs 3422 and 3424, the inductor L2 and the capacitor Co2, as in the first embodiment.

In other embodiments, either one or both of the normally-on JFETs 324 and 3424 may be replaced with MOSFETs or normally-off JFETs.

Due to the first converter stage 32 using MOSFET or normally-off JFET to serve as the high-side switch, at the moment of the two-step DC-to-DC converter 30 and 40 powered on and powered off, the MOSFET or normally-off JFET is cut-off. Before the MOSFET or normally-off JFET turns on, a negative voltage is able to build up for the $V_{gs}$ of the normally-on JFET 3422, such that the normally-on JFET 3422 could be controlled to turn off. Since the normally-on JFET of the second converter stage 34 has a lower impedance than that of a MOSFET or a normally-off JFET, the efficiency of the two-step DC-to-DC converter 30 and 40 is improved.

For simplicity, the above embodiments are designed with two converter stages, and it would be understood that more converter stages might be implemented in a DC-to-DC converter. However, it is required at least one converter stage has its high-side switch not a normally-on JFET for preventing the supply voltage short to the converter output. Preferably, the high-side switch of the first converter stage coupled with the supply voltage is not a normally-on JFET, and the other high-side and low-side switches of the DC-to-DC converter are all normally-on JFETs to improve the efficiency as more as possible.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A two-step DC-to-DC converter comprising:
    a first converter stage for converting a first voltage to a second voltage at an output of the first converter stage, the first converter stage including a normally-off JFET for serving as a high-side switch connected in series with a low-side switch, wherein the normally-off JFET high-side switch prevents current flow from the output during power-on and power-off transients; and
    a second converter stage being coupled to the output of the first converter stage and including a plurality of channels for converting the second voltage of the first converter stage to an output voltage, each of the channels including a normally-on JFET for serving as a high-side switch connected in series with a low-side switch.

2. The converter of claim 1, wherein the low-side switch of the first converter stage is a normally-on JFET.

3. The converter of claim 1, wherein the low-side switch of the second converter stage is a normally-on JFET.

4. A two-step DC-to-DC converter comprising:
    a first converter stage for converting a first voltage to a second voltage at an output of the first converter stage, the first converter stage including a MOSFET for serving as a high-side switch connected in series with a low-side switch, wherein the MOSFET high-side switch prevents current flow from the output during power-on and power-off transients; and
    a second converter stage being coupled to the output of the first converter stage and including a plurality of channels for converting the second voltage to an output voltage, each of the channels including a normally-on JFET for serving as a high-side switch connected in series with a low-side switch.

5. The converter of claim 4, wherein the low-side switch of the first converter stage is a normally-on JFET.

6. The converter of claim 4, wherein the low-side switch of the second converter stage is a normally-on JFET.

* * * * *